(12) United States Patent
Shapiro (10) Patent No.: US 10,753,223 B2
(45) Date of Patent: Aug. 25, 2020

(54) ACTIVE CENTERING CONTROL FOR STATIC ANNULAR TURBINE FLOWPATH STRUCTURES

(71) Applicant: General Electric Company, Schenectady, NY (US)

(72) Inventor: Jason David Shapiro, Methuen, MA (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 15/724,628

(22) Filed: Oct. 4, 2017

(65) Prior Publication Data

US 2019/0101016 A1   Apr. 4, 2019

(51) Int. Cl.
*F01D 11/22* (2006.01)
*F01D 25/24* (2006.01)
*F01D 21/04* (2006.01)

(52) U.S. Cl.
CPC .............. *F01D 11/22* (2013.01); *F01D 21/04* (2013.01); *F01D 25/246* (2013.01); *F05D 2220/32* (2013.01); *F05D 2230/642* (2013.01); *F05D 2250/36* (2013.01); *F05D 2270/44* (2013.01)

(58) Field of Classification Search
CPC ..... F01D 11/22; F01D 25/246; F05D 2220/32
USPC .................................................... 415/173.1
See application file for complete search history.

(56) References Cited

U.S. PATENT DOCUMENTS

| | | | |
|---|---|---|---|
| 4,683,716 A | | 8/1987 | Wright et al. |
| 5,263,816 A | * | 11/1993 | Weimer .................. F16C 39/06 |
| | | | 415/131 |
| 5,269,816 A | * | 12/1993 | Taylor ................... C09B 62/043 |
| | | | 8/543 |
| 7,596,954 B2 | | 10/2009 | Penda et al. |
| 7,654,791 B2 | | 2/2010 | Werner |
| 8,011,883 B2 | | 9/2011 | Schwarz et al. |
| 8,555,477 B2 | | 10/2013 | Bates |
| 9,157,331 B2 | | 10/2015 | Laurello |
| 9,458,855 B2 | | 10/2016 | Dierksmeier et al. |
| 9,587,507 B2 | | 3/2017 | Ottow |
| 2010/0296911 A1 | * | 11/2010 | McCallum ............. F01D 11/22 |
| | | | 415/1 |
| 2012/0057958 A1 | * | 3/2012 | Klingels ................. F01D 11/22 |
| | | | 415/1 |
| 2015/0092039 A1 | * | 4/2015 | Ruhge .................... G01B 21/16 |
| | | | 348/82 |
| 2016/0102571 A1 | * | 4/2016 | Cortequisse ............. F01D 1/20 |
| | | | 415/1 |
| 2018/0328721 A1 | * | 11/2018 | Hatcher, Jr. ............ G01B 11/14 |

* cited by examiner

*Primary Examiner* — Joseph J Dallo
*Assistant Examiner* — Yi-Kai Wang
(74) *Attorney, Agent, or Firm* — McGarry Bair PC (57) ABSTRACT

A rotor assembly apparatus that includes a rotatable component and a ring-shroud. The rotatable component is mounted for rotation about a first axis. The ring-shroud defines an inner surface that surrounds the rotatable component and that defines a second axis. A sensing system is configured to monitor the position of the first axis relative to the second axis. A casing surrounds the ring-shroud and an actuation system is configured to move the ring-shroud relative to the casing, in response to the sensing system.

22 Claims, 7 Drawing Sheets

ACTIVE CENTERING CONTROL FOR STATIC ANNULAR TURBINE FLOWPATH STRUCTURES

BACKGROUND OF THE INVENTION

This invention relates generally to gas turbine engines, and more particularly relates to rotors and shrouds in such engines.

A gas turbine engine includes, in serial-flow communication, a compressor, a combustor, and a turbine. The turbine is mechanically coupled to the compressor, and the three components define a turbomachinery core. The core is operable in a known manner to generate a flow of hot, pressurized combustion gases to operate the engine as well as perform useful work such as providing propulsive thrust or mechanical work.

A gas turbine engine includes several rotors each of which includes a rotating disk carrying an array of airfoils referred to as blades. The blades of each rotor are surrounded by a ring-shroud. The ring-shroud is configured to define a flowpath for gases and is supported by a casing. Ring-shrouds can be made from metallic materials or from single-piece ceramic matrix composites. The dimensions of the ring-shrouds define the clearances between the blades and an inner surface of the ring-shroud.

The clearances are conventionally very small. As a result, thermal expansion and relative movement of the rotor relative to the ring-shroud can cause contact between blades and the inner surface of the ring-shroud. This can lead to undesirable wear or damage.

Therefore there is a need for an apparatus to maintain a minimum clearance between the blades and the inner surface of the ring-shroud.

BRIEF DESCRIPTION OF THE INVENTION

This need is addressed by providing a clearance control apparatus that is configured to maintain a minimum tip clearance by moving the ring-shroud relative to the rotor and the casing.

According to one aspect of the technology described herein, there is provided a rotor assembly apparatus that includes a rotatable component and a ring-shroud. The rotatable component is mounted for rotation about a first axis. The ring-shroud defines an inner surface that surrounds the rotatable component and that defines a second axis. A sensing system is configured to monitor the position of the first axis relative to the second axis. A casing surrounds the ring-shroud and an actuation system is configured to move the ring-shroud relative to the casing, in response to the sensing system.

According to another aspect of the technology described herein, there is provided a method for maintaining the relative position of rotatable components and ring-shrouds of a turbine engine. The method includes the steps of: monitoring the relative positions of a rotatable component and a ring-shroud surrounding the rotatable component; maintaining at least a minimum clearance between the rotatable component and the ring-shroud; and moving the ring-shroud as necessary to maintain the minimum clearance.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
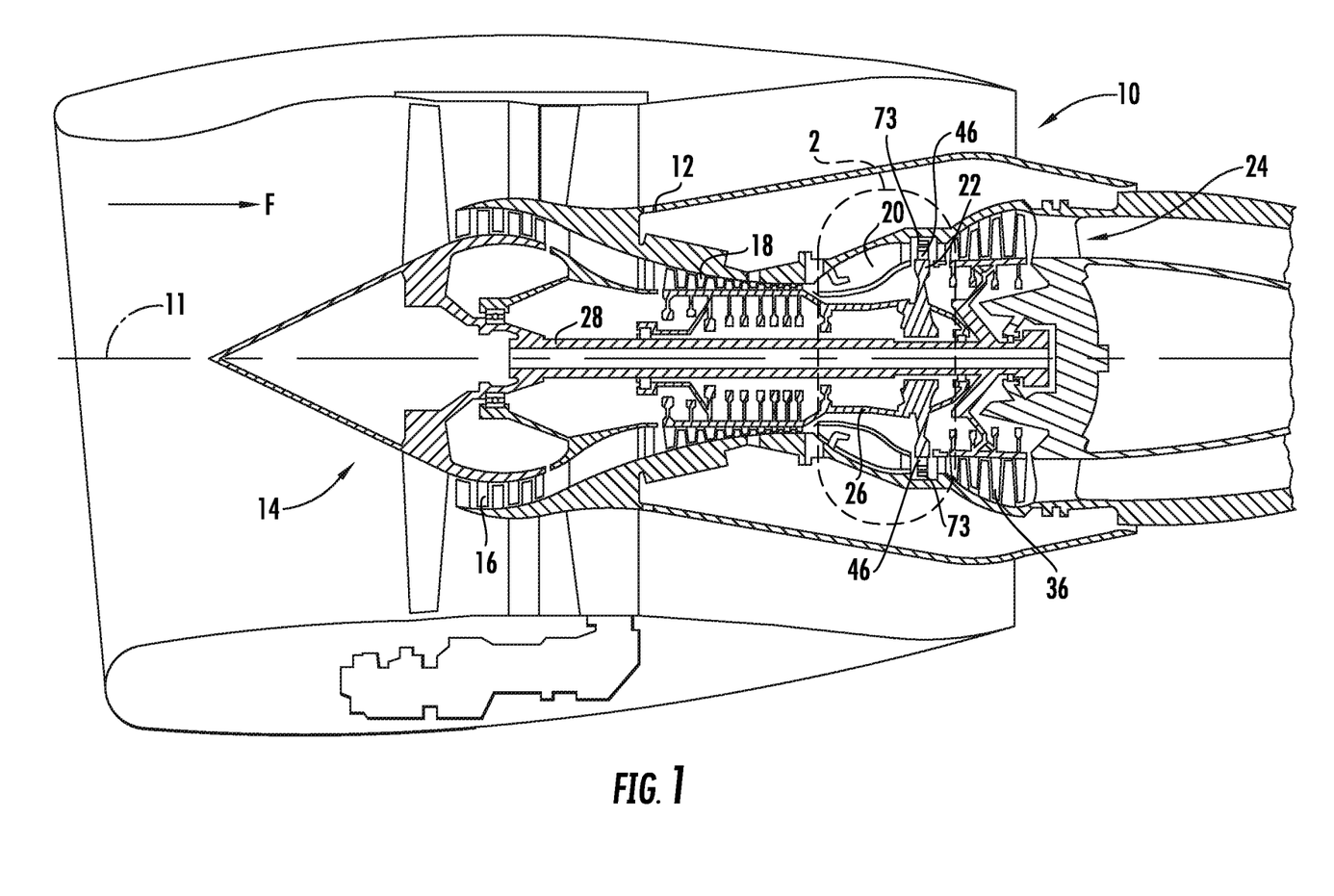
FIG. 1 is a cross-sectional schematic view of a gas turbine engine that incorporates a clearance control apparatus associated with a ring-shroud.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines. Such engines can be low-bypass turbofans, turbojets, turboprops, etc., as well as to land vehicles, land-based gas turbine engines, or other types of turbomachinery such as steam turbines.

The engine 10 has a longitudinal center line or axis 11 and a stationary core casing 12 disposed concentrically about and coaxially along the axis 11. It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, a booster 16, a compressor 18, a combustor 20, a high pressure turbine or "HPT" 22, and a low pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into the low pressure turbine 24 which drives the fan 14 and booster 16 via an inner shaft 28.

The engine 10 includes a turbomachinery rotor 36 that is a representative of a rotatable component as that term is used herein. The concepts of the present invention will be described using the rotor 36 embodied in the HPT 22 as an example. It will be understood that those concepts are applicable to any rotor or rotor-like component in a gas turbine engine, such as compressor or turbine rotors. The rotor 36 is rotatable about a first axis 37 (see FIG. 4).

Figure 2:
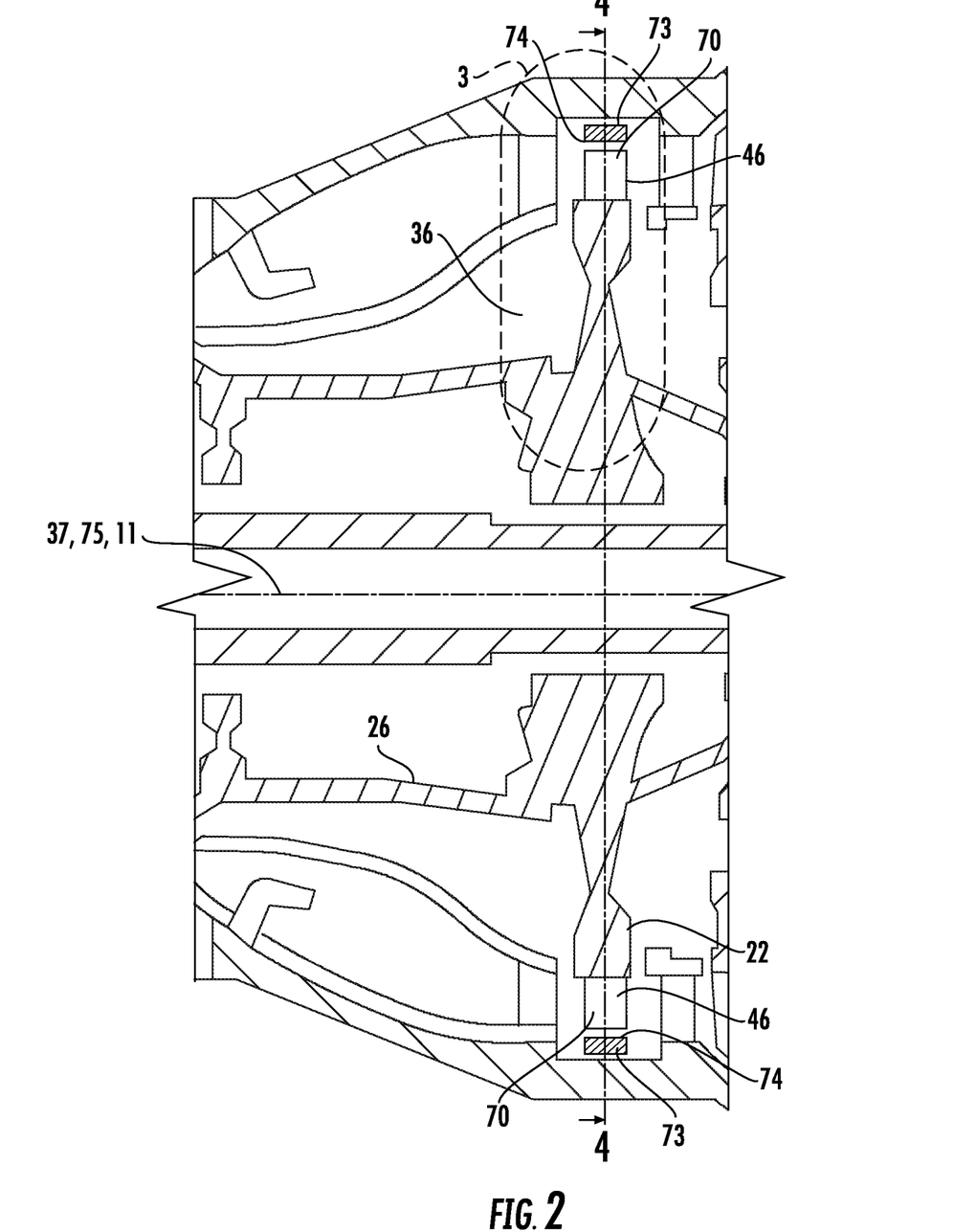
FIG. 2 is a radial cross-sectional schematic view of taken at region 2 of the gas turbine engine shown in FIG. 1 showing the relative position of a rotor, a ring-shroud, and a casing.
Figure 3:
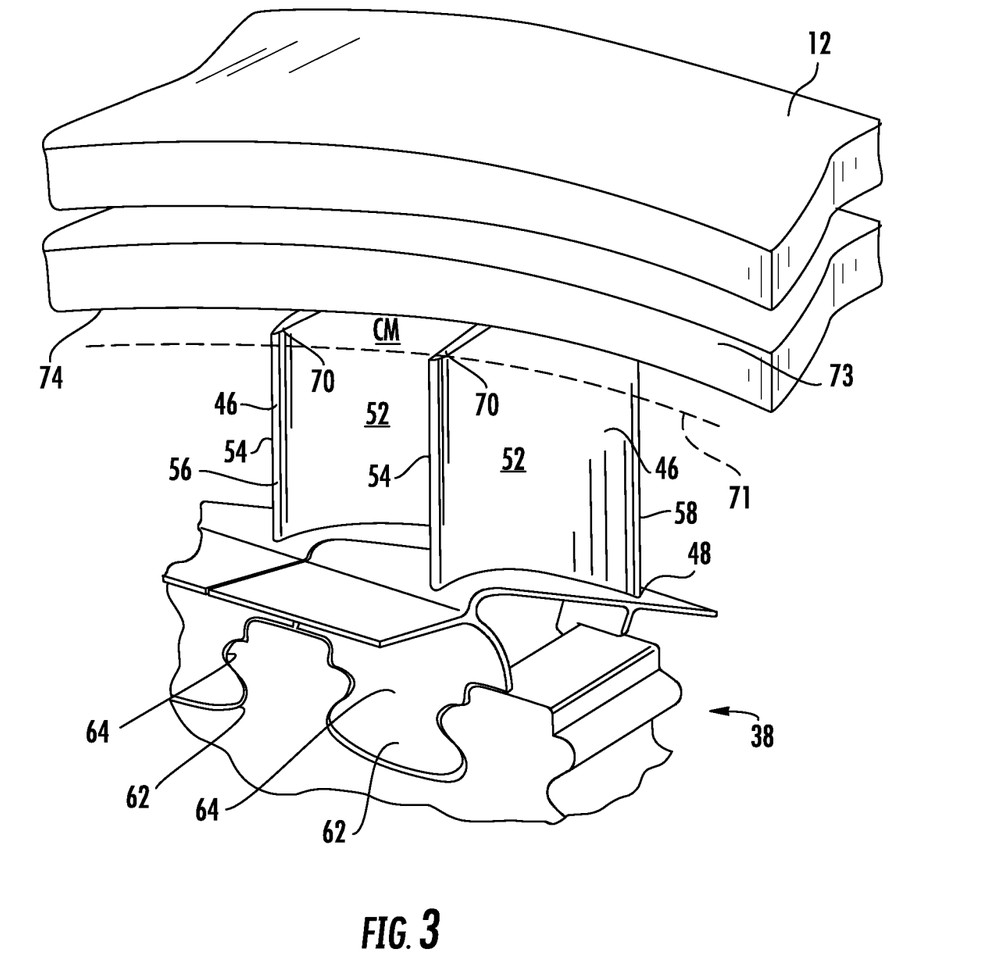
FIG. 3 is a perspective view of a section of the rotor shown in FIG. 2 at region 3.

Referring now to FIGS. 2 and 3, the rotor 36 includes a disk 38, and an array of turbine blades 46 extends from the disk 38. The rotor 36 is concentric to the axis 11 and the inner shaft 28. In FIG. 3, two of the turbine blades 46 are shown. The turbine blades 46 constitute "turbomachinery airfoils" for the purposes of this technology. Each turbine blade 46 extends from a root 48 to a blade tip 70, and includes a concave pressure side 52 joined to a convex suction side 54 at a leading edge 56 and a trailing edge 58. The root 48 of each blade 46 includes a dovetail 62 and a shank 64.

The disk 38 and turbine blades 46 may be constructed from any material capable of withstanding the anticipated stresses and environmental conditions in operation. Non-limiting examples of known suitable alloys include nickel- and cobalt-based alloys.

Together, blade tips 70 define a perimeter 71 such that the perimeter 71 is spaced-apart from a ring-shroud 73. The ring-shroud 73 is supported by the casing 12 in a manner described further below. It should be noted that the casing 12 is considered herein as stationary relative to the engine 10. Thus both the ring-shroud 73 and the casing 12 are non-rotatable components. As described herein, movement of the outer shaft 26, the rotor 36 and the ring-shroud 73 is determined relative to the casing 12 unless otherwise indicated. The ring-shroud 73 defines a second axis 75.

The ring-shroud 73 defines an inner surface 74. The inner surface 74 is spaced-apart from the blade tip perimeter 71 by minimum clearance CM. The ring-shroud 73 is generally circular. As used herein, the term "ring-shroud" refers to a member that is functionally equivalent to a unitary annular ring. In practice, a ring-shroud could be single-piece construction or could be made up from a plurality of arcuate segments joined together. In the illustrated embodiment, the ring-shroud 73 is formed of a single, unitary piece. By way of example and not limitation, the ring-shroud 73 can be constructed in whole or in part from a low density, high-temperature capable material. Examples of such materials include composite materials such as ceramic matrix composites ("CMC"). Generally, commercially available CMC materials include a ceramic type fiber carried in a ceramic type matrix. Examples of known types of CMC materials are referred using broad classifications of SiC/SiC, C/SiC, C/C, and Ox/Ox (oxide-oxide). In general, such materials have a low density, high-temperature capabilities, and high strength-to-weight ratios, but also have lower ductility than metal alloys. These materials will be referred to generally herein as "ceramic-based composites".

Figure 4:
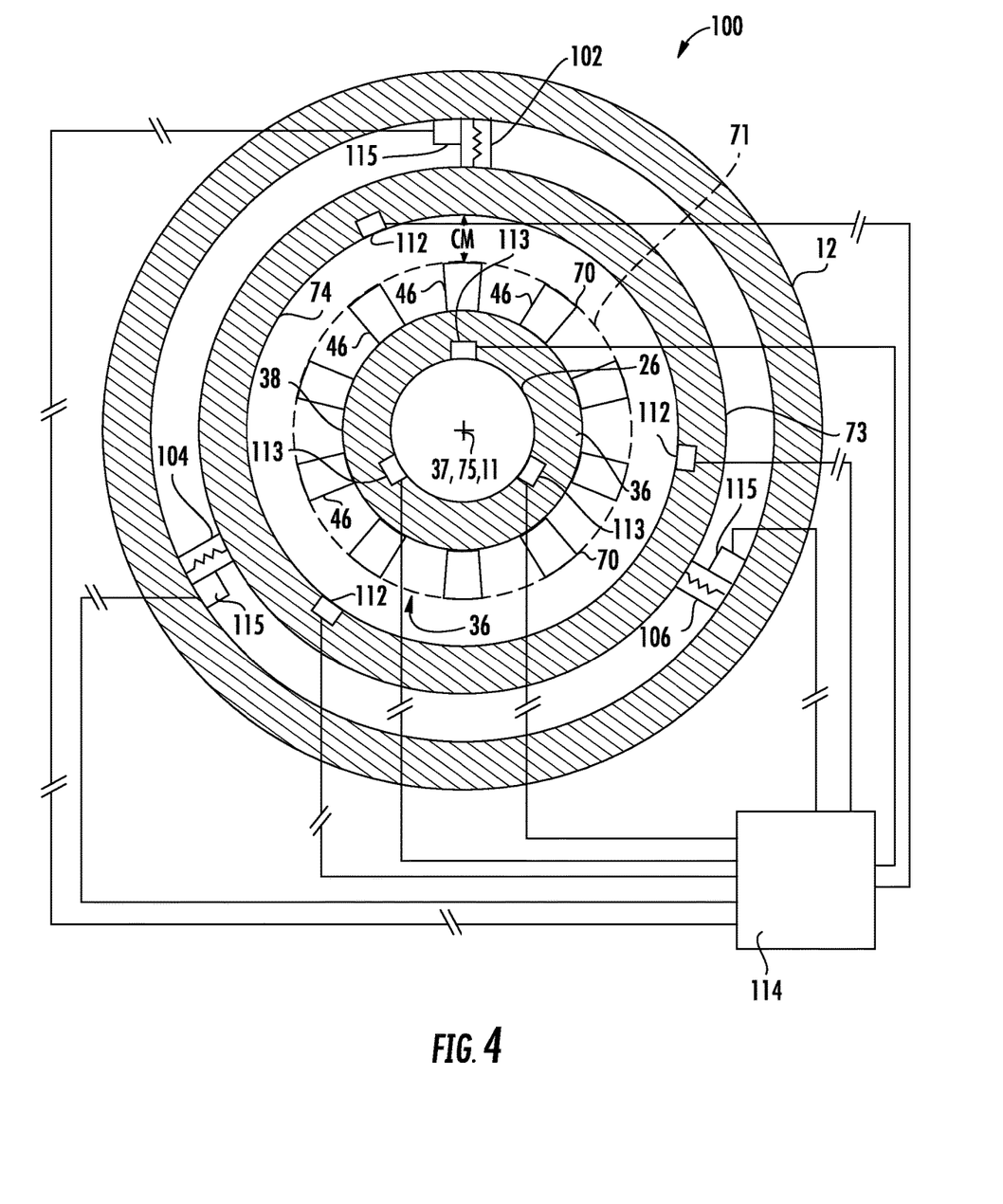
FIG. 4 is a view taken along the line 4-4 of the radial cross section of the region shown in FIG. 2 illustrating a normal condition during which the engine is under a first operational load.

FIG. 4 illustrates an exemplary rotor assembly apparatus 100. The apparatus 100 can advantageously be used with any rotatable component surrounded by a non-rotatable component, such as any of the rotors of a gas turbine engine such as the engine 10 illustrated in FIG. 1, and its surrounding shroud. During the operation of the engine 10, minimum operating clearances are required over the operating range of the engine. The apparatus 100 is operable to control the relative position (e.g. concentricity) of the first axis 37 of the rotor 36 and the second axis 75 of the ring-shroud 73 by moving the first axis 37 relative to the second axis 75. As will be explained further below, this positional control can be used ultimately to assure a desired radial clearance between the two components.

According to the illustrated embodiment of the technology disclosed herein, a rotor assembly apparatus 100 includes a control device 114. The control device 114 is a generalized representation of the hardware and/or software required to control the operation of the apparatus 100. The control device 114 may be embodied, for example, by software running on one or more processors embodied in one or more devices such as a programmable logic controller ("PLC") or a microcomputer. Such processors may be coupled to sensors and operating components, for example, through wired or wireless connections. Optionally, the control device 114 may be operably connected to or may be integrated into a controller (not shown) configured to monitor and control overall operation of the engine 10, such as a full authority digital engine control ("FADEC"). The control device 114 is operably connected to a plurality of positioning mechanisms. Nonlimiting examples of suitable positioning mechanisms include hydraulic, pneumatic, mechanical or electromagnetic actuators. The number and type of positioning mechanisms may be selected to suit a particular application. In general, the provision of at least three single-axis actuators will permit control of the position of the ring-shroud 73 in two mutually perpendicular axes. In the illustrated example, the control device 114 is connected to a first positioning mechanism 102, a second positioning mechanism 104, and a third positioning mechanism 106 such that signals effective for actuation can be provided thereto. The three positioning mechanisms 102, 104, 106 are radially spaced apart and are configured for controlling the minimum clearance CM between the perimeter 71 of the blade tips 70 and the inner surface 74 of the ring-shroud 73.

The positioning mechanisms 102, 104, 106, are each supported by the casing 12 and are each coupled to the ring-shroud 73. In this manner, the ring-shroud 73 is supported by the casing 12. Each of the positioning mechanisms 102, 104, 106, are configured to be actuated to move the ring-shroud 73 toward and away from the perimeter 71 of the rotor blade tips 70. Cooperative or synchronized actuation of the positioning mechanisms 102, 104, 106 by the control device provides a mechanism through which the relative position of the casing 12 and the ring-shroud 73 may be controlled, ultimately permitting the minimum clearance CM to be controlled. For example, see FIG. 6 where positioning mechanisms 104 and 106 are extended and positioning mechanism 102 is retracted.

Means are provided for determining the positions of the first axis 37 and the second axis 75 relative to the casing 12 and, as a result, to each other. Nonlimiting examples of suitable sensors include magnetic sensors between the rotor 36 and static structure of the engine 10, piezoelectric or strain gauges coupled to the bearings supporting the rotor 36, mechanical probes in contact with the rotor 36, or multiple pressure taps or clearanceometers circumferentially spaced around the ring-shroud 73.

A plurality of first sensors 113 is configured to generate a signal indicative of the position of the first axis 37. A plurality of second sensors 112 is configured to generate a signal indicative of the position of the second axis 75. In addition, conventional rotor clearance sensor 112 can be used for sensing the actual rotor blade to tip shroud clearance.

In the illustrated example, a first sensor 113, a second sensor 112, and a third sensor 115 are associated with each positioning mechanism 102, 104, 106. The first sensors 113 are each configured to send a signal indicative of the location of the first axis 37 relative to the casing 12 to the control device 114. The third sensors 115 are each configured to send a signal indicative of the location of the second axis 75 relative to the casing 12 to the control device 114. The first sensor(s) 113 together with the third sensor(s) 115 and the control device 114 are an example of a sensing system. In this regard, the control device 114 determines the relative position of the first axis 37 to the second axis 75 by addition or subtraction operations performed with the signals from the first sensors 113 and the third sensors 115. When used in this way, the first sensors 113 and the second sensors 115 form a plurality of first sensors that are part of a sensing system. The control device 114 is configured to activate the associated positioning mechanism 102, 104, 106 accordingly.

The second sensors 112 are each configured to send a signal indicative of the radial clearance between the blade tips 70 and the shroud 73 ("tip clearance") near the associated positioning mechanism 102, 104, 106 to the control device 114. The second sensors 112 and the control device 114 form an example of a second sensing system or monitoring device and the second sensors 112 form a plurality of sensors that are part of the sensing system. The positioning mechanisms 102, 104, and 106 and the control device 114 form an actuation system.

The disclosed technology can be better understood from the description of the operation thereof. The engine 10 is configured such that the inner shaft 28 is concentric with the outer shaft 26, the ring-shroud 73 and the casing 12 during normal, level operation. Such a normal operating condition is shown in FIG. 4 in which the rotor 36, the ring-shroud 73, and the casing 12 are concentric. The centerline axis 11, the first axis 37 (defined by the rotor 36) and the second axis 75 (defined by the ring-shroud 73) are generally in the same location, i.e., these components are coaxial.

Figure 5:
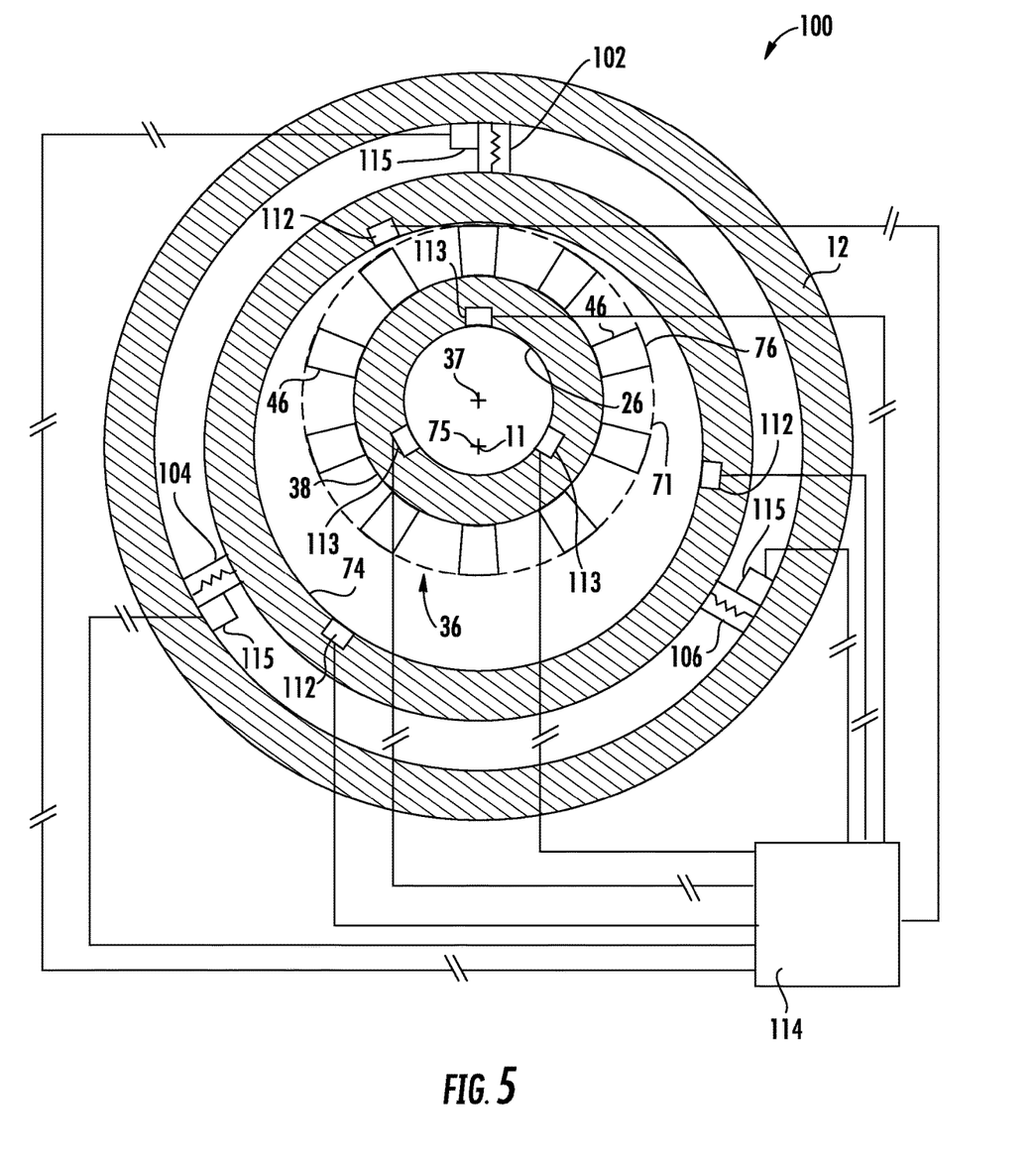
FIG. 5 is a view of the cross section of FIG. 4 showing the engine in a first configuration under a second operational load during a first maneuver.

During a first operating condition, such as a yaw in flight maneuvers, loads can be generated that result in moving the outer shaft 26, and thus the rotor 36, relative to the casing 12. FIG. 5 shows the first operating condition in which the rotor 36 is shifted such that it is no longer concentric with the ring-shroud 73 or the casing 12. As shown in FIG. 5, the minimum tip clearance CM is not maintained.

The sensor 112 near mechanism 102 (e.g. approximately 12 o'clock in the figure) generates a signal that indicates that the rotor 36 has moved toward the ring-shroud 73 at that location. Correspondingly the sensors 112 associated with mechanisms 104 and 106 indicate that the rotor 36 has moved away from the ring-shroud 73 at their respective locations. Control device 114 uses this information and operates to move the ring-shroud 73 such that it is concentric with the rotor 36 and the minimum clearance CM is maintained at a predetermined value and the rotor assembly 100 is in a second condition. This operation includes the retraction of mechanism 102 and the extension of mechanisms 104 and 106.

It should be appreciated that control of the relative positions of the first axis 37 to the second axis 75 produces effectively the same result. In this regard, the first sensors 113 and the third sensors 115 are configured to monitor the position of the first axis 37 relative to the second axis 75. The actuator system, includes the positioning mechanisms 102, 104, and 106, is configured to move the ring-shroud such that the first axis is maintained generally coaxial with in response to the sensing system. In this manner, the first axis 37 and the second axis 75 are maintained as being coaxial and the minimum tip clearance CM is maintained at the predetermined value.

Figure 6:
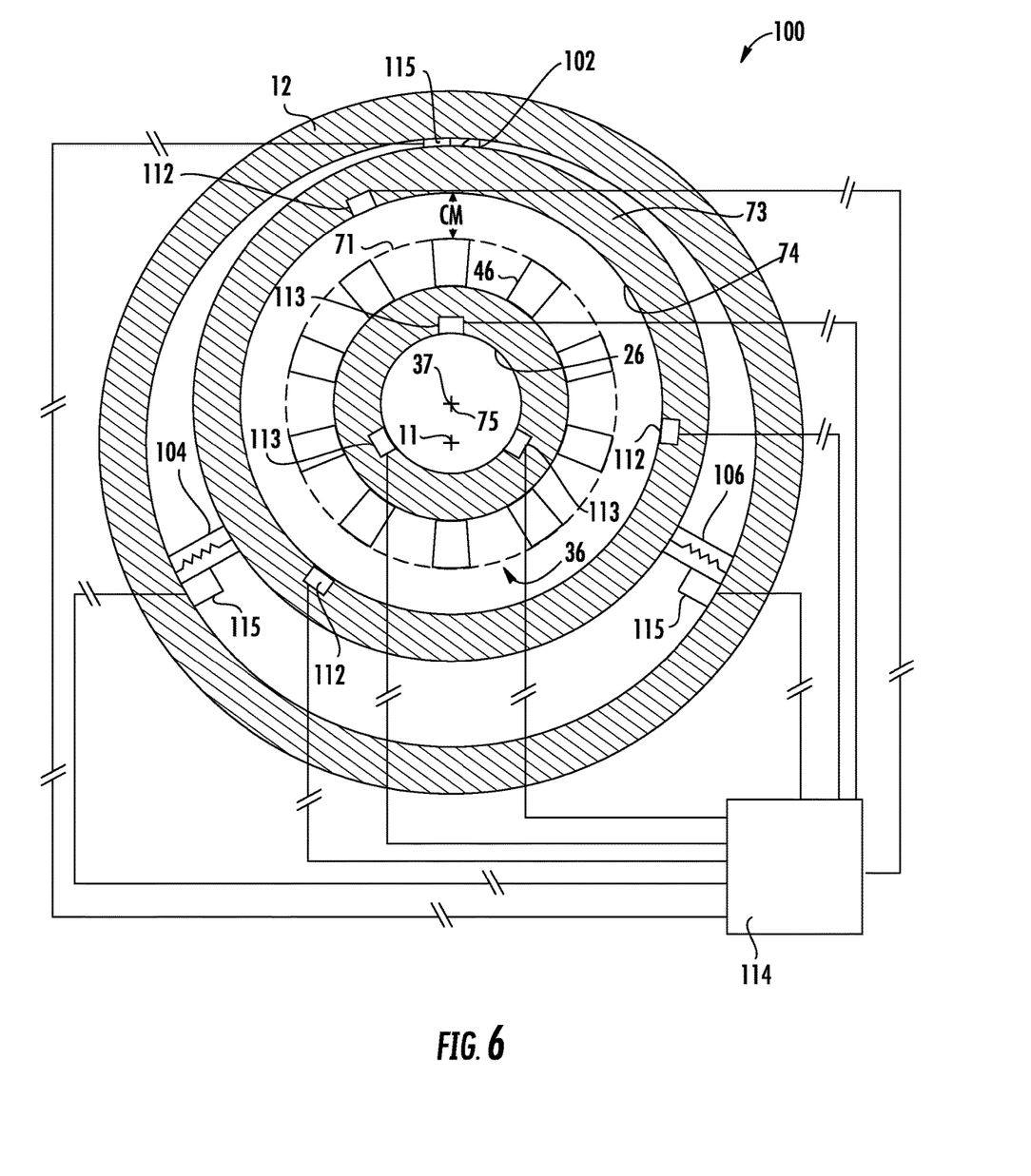
FIG. 6 is a view of the cross section of FIG. 4 showing the engine in a second configuration under the load illustrated in FIG. 5 after operation of the clearance control apparatus.

The second condition is shown in FIG. 6. Each of the first positioning mechanism 102, the second positioning mechanism 104, and the third positioning mechanism 106 were extended or retracted to effect the movement determined by the control device 114. These actions are embodied in a step of moving the ring-shroud 73 relative to the casing 12. The actions of sensing and actuating can be repeated in a continuous cycle during engine operation in order to maintain the rotor 36 coaxial with the ring-shroud 73.

It should be appreciated that the step of moving can occur in anticipation of a future operational load that is likely to cause the rotatable component to move relative to the non-rotatable component. Control device 114 can be configured to obtain predictive information from an external source such as an aircraft flight control system or an accelerometer and to move the ring-shroud 73 in a timed manner to preposition it for the expected load.

Figure 7:
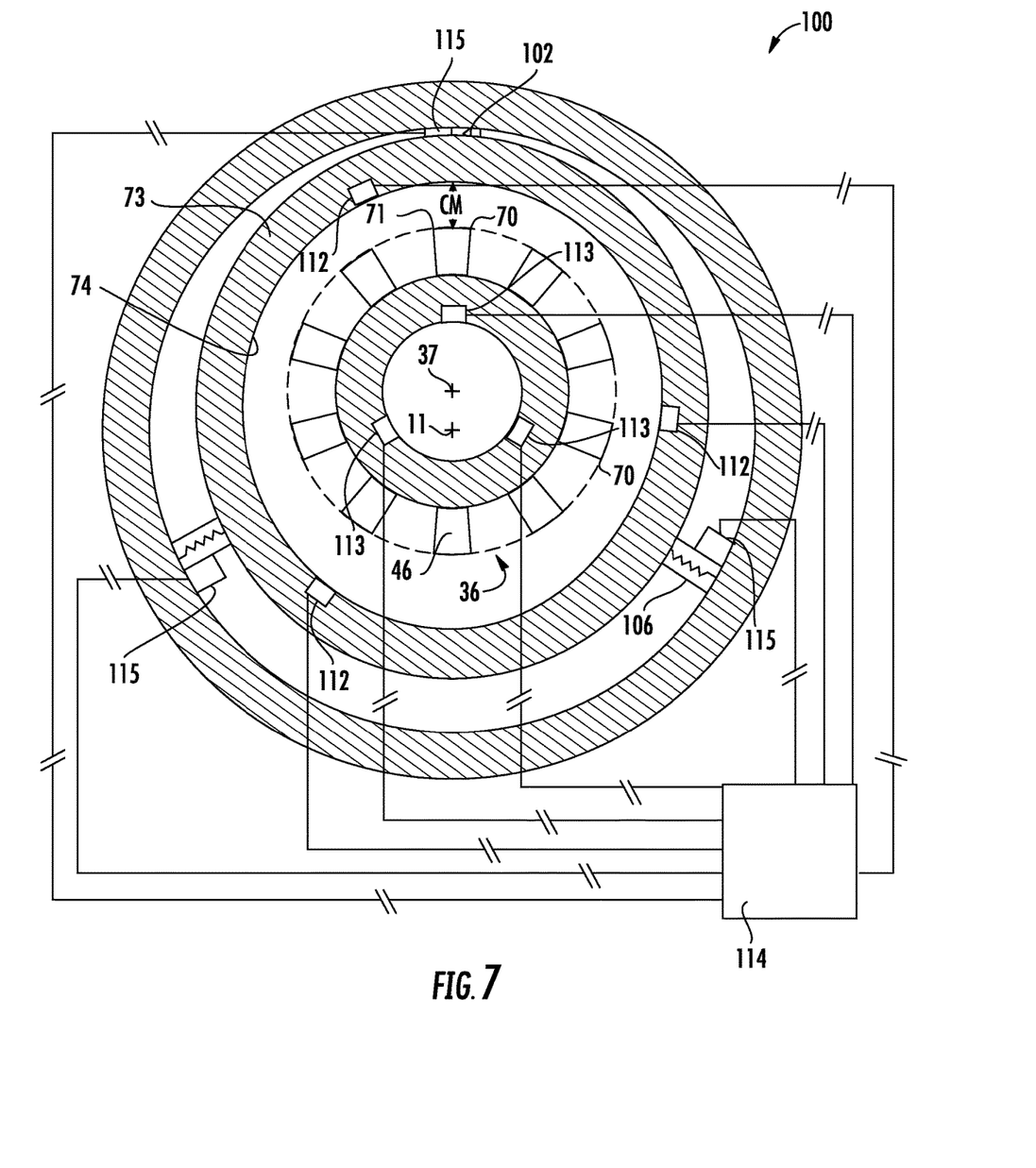
FIG. 7 is a view of the cross section of FIG. 4 showing the engine in a third configuration under the load illustrated in FIG. 5 after operation of the clearance control apparatus according to an alternative method described herein.

In addition to or as an alternative to moving the ring-shroud 73 relative to the casing 12 as described above, the actuating system could be used to temporarily deform the ring-shroud 73 in order to elongate its dimensions in at least one axis and thereby provide appropriate clearance. For example, FIG. 7 illustrates an operating condition in which the rotor 36 is shifted such that it is no longer concentric with the ring-shroud 73 or the casing 12. In order to maintain the minimum tip CM, the ring-shroud 73 has been deformed into a generally oval shape being generally longer in a vertical plane as depicted in the figure and generally shorter in the horizontal plane as depicted in the figure. This deformation can be achieved by unsynchronized operation of the actuation system. It should be appreciated that because the ring shroud 73 is deformable, movement of one of the mechanisms 102, 104, 106 from a first position to a second position is possible even if the remaining two mechanisms do not move from their respective first positions. The ring-shroud can be deformed to a variety of shapes. Such shapes can be determined by the number of positioning mechanisms attached between ring-shroud 73 and the casing 12 and the configuration of the mechanisms.

The foregoing has described a shroud apparatus and a method for its operation. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A rotor assembly apparatus, comprising:
a rotatable component mounted for rotation about a first axis;
a ring-shroud that defines an inner surface surrounding the rotatable component, wherein the inner surface defines a second axis;
a casing surrounding the ring-shroud;
a first sensor associated with the rotatable component for monitoring a position of the first axis;

a second sensor associated with the ring-shroud configured to generate a signal indicative of a radial clearance between the inner surface and the rotatable component;
a third sensor supported by the casing for monitoring a position of the second axis with respect to the casing, and together with the first sensor forming a first sensing system configured to monitor the position of the first axis relative to the second axis; and
an actuation system configured to move the ring-shroud relative to the casing in response to the sensing system.

2. The rotor assembly apparatus according to claim 1, wherein a cross-section of the inner surface of the ring-shroud is circular.

3. The rotor assembly apparatus according to claim 1, wherein the actuation system includes a plurality of positioning mechanisms.

4. The rotor assembly apparatus according to claim 3, wherein the actuation system is configured to move the ring-shroud such that the first axis is maintained coaxial with the second axis.

5. The rotor assembly apparatus according to claim 3, wherein the plurality of positioning mechanisms are spaced apart and configured to control a minimum clearance between the inner surface and the rotatable component.

6. The rotor assembly apparatus according to claim 1, wherein the rotatable component is a rotor including a plurality of turbomachinery blades each having a blade tip.

7. The rotor assembly apparatus according to claim 6, wherein the second sensor is a plurality of spaced-apart sensors configured to generate a signal indicative of a tip clearance distance between a perimeter defined by the blade tips and the inner surface.

8. The rotor assembly apparatus according to claim 7, wherein the actuation system is configured to deform the ring-shroud to maintain a predetermined tip clearance distance.

9. The rotor assembly apparatus according to claim 1, wherein the first sensor is a plurality of first sensors configured to generate a first signal indicative of the relative position of the rotatable component and the casing and the third sensor is a plurality of third sensors configured to generate a second signal indicative of the ring-shroud and the casing.

10. The rotor assembly apparatus according to claim 9 further comprising:
a control device configured to receive the first signal and the second signal;
a plurality of positioning mechanisms that is operable to move the ring-shroud relative to the rotatable component in response to instructions provided by the control device; and
wherein the control device is configured to control the relative position of the ring-shroud and the rotatable component at a constant position.

11. A method for maintaining the relative position of a rotatable component and a ring-shroud disposed within a casing of a turbine engine, the method comprising the steps of:
sensing with a first sensor a location of a first axis defined by the rotatable component;
sensing with a second sensor associated with a ring-shroud a minimum clearance between the rotatable component and the ring-shroud;
sensing with a third sensor supported by the casing a location of a second axis defined by the ring-shroud surrounding the at least one rotatable component;
monitoring with a control device a relative position of the first axis to the second axis;
maintaining at least a minimum clearance between the rotatable component and the ring-shroud; and
moving the ring-shroud as necessary to maintain the minimum clearance.

12. The method according to claim 11, wherein the step of monitoring includes sensing the clearance between the rotatable component and the ring-shroud.

13. The method according to claim 12, wherein the step of moving the ring-shroud includes moving the entire ring-shroud as one unitary piece.

14. The method according to claim 13, wherein the step of moving the entire ring-shroud includes the step of actuating at least one positioning mechanism.

15. The method according to claim 14, wherein the step of moving the entire ring-shroud includes the step of actuating at least three positioning mechanisms in a synchronized manner.

16. The method according to claim 11, wherein the step of moving the ring-shroud occurs when predictive information regarding a future operational load is received at the controller where the future operational load will cause the rotatable component to move relative to the ring-shroud.

17. A method for maintaining the relative position of the rotatable component and the ring-shroud of the rotor assembly apparatus of claim 1, the method comprising the steps of:
monitoring with a control device a relative position between a rotatable component and a ring-shroud surrounding the rotatable component;
maintaining at least a minimum clearance between the rotatable component and the ring-shroud; and
deforming the ring-shroud by elongating a dimension of the ring-shroud along at least one axis as necessary to maintain the minimum clearance.

18. The method according to claim 17, wherein the step of monitoring includes sensing the clearance between the rotatable component and the ring-shroud.

19. The method according to claim 18, wherein the step of deforming the ring-shroud includes the step of actuating at least one positioning mechanism.

20. The method according to claim 19, wherein the step of deforming the ring-shroud includes the step of actuating at least three positioning mechanisms in a synchronized manner.

21. The rotor assembly apparatus according to claim 1 further comprising a second sensing system including a control device configured to receive a signal indicative of the position of the second axis and the second sensor.

22. A rotor assembly apparatus, comprising:
a rotatable component mounted for rotation about a first axis;
a ring-shroud that defines an inner surface surrounding the rotatable component, wherein the inner surface defines a second axis;
a casing surrounding the ring-shroud;
a sensing system configured to monitor the position of the first axis relative to the second axis; the sensing system comprising at least two sensors, a first sensor associated with the rotatable component for monitoring a position of the first axis with respect to the casing; a second sensor supported by the casing for monitoring a position of the second axis with respect to the casing; and an actuation system configured to move the ring-shroud relative to the casing in response to the sensing system.

* * * * *